Dec. 26, 1933.   R. B. POINDEXTER   1,941,020
HEATING INSTALLATION
Filed Sept. 13, 1928   2 Sheets-Sheet 2
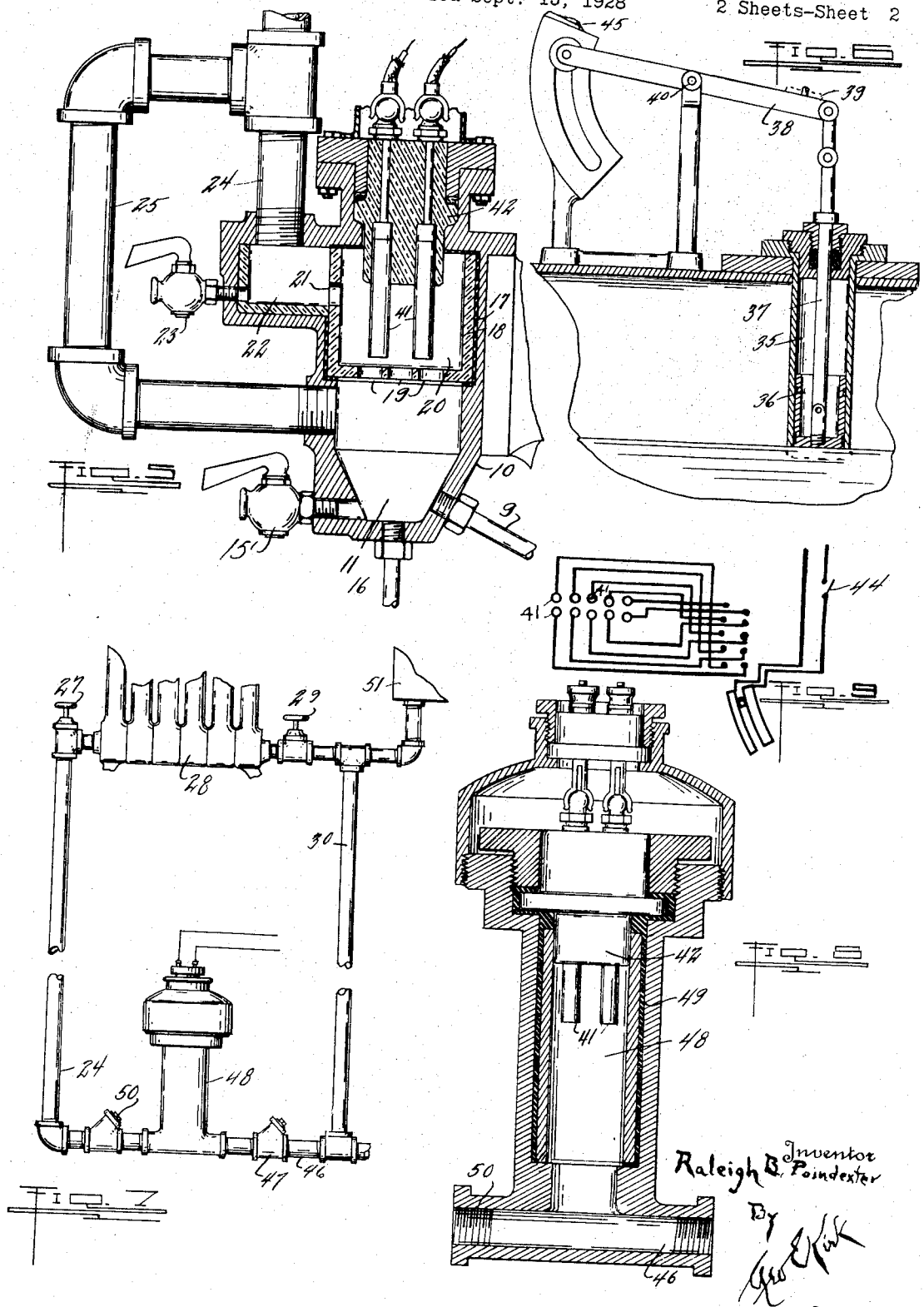
Raleigh B. Poindexter, Inventor
By *[signature]*
Attorney Patented Dec. 26, 1933

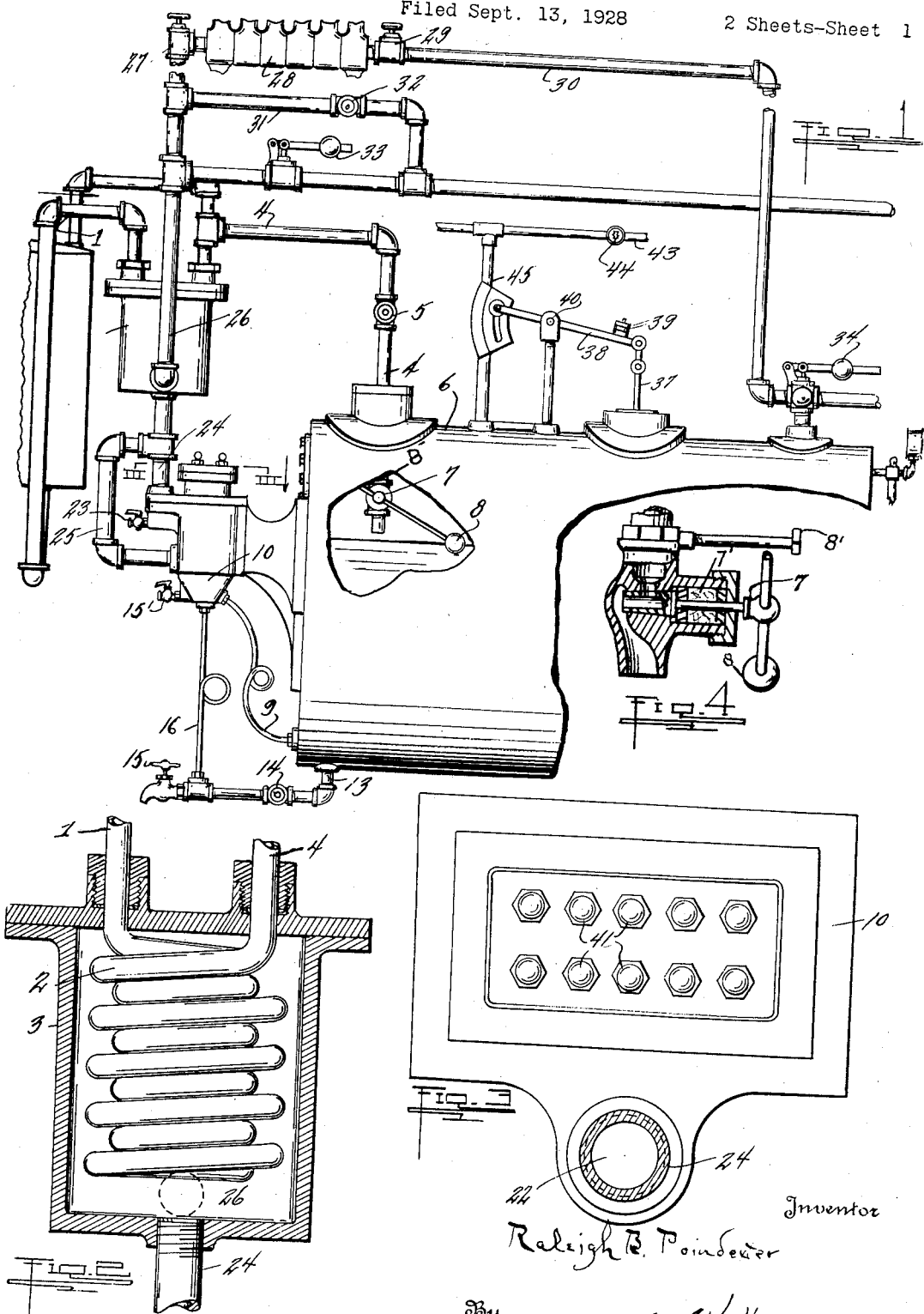

1,941,020

UNITED STATES PATENT OFFICE 1,941,020

HEATING INSTALLATION

Raleigh B. Poindexter, Toledo, Ohio

Application September 13, 1928
Serial No. 305,714

2 Claims. (Cl. 219—40)

This invention relates to electrically heating liquids.

This invention has utility when incorporated in power or heating installations for buildings.

Referring to the drawings:

Fig. 1 is a fragmentary view of an embodiment of the invention in a heating plant installation of the steam type or so-called vapor;

Fig. 2 is a preheater, in vertical section, as incorporated in Fig. 1;

Fig. 3 is a view on the line III—III, Fig. 1;

Fig. 4 is a view in vertical section through the supply control valve;

Fig. 5 is a view in vertical section through the boiler of Fig. 5;

Fig. 6 is a fragmentary view of the heater controller for the installation of Fig. 1;

Fig. 7 is a fragmentary view of the electric heater as connected up in a hot water plant heating installation;

Fig. 8 is a detail view of the heater of Fig. 7; and

Fig. 9 is a wiring diagram of the electrical features of the controller.

Water supply line 1 from say a tank of the range boiler type, is shown as extending to coil 2 in preheater chamber 3 and from thence via line 4 past manually operable valve 5 into reservoir 6. Any discharge flow of water by the line 4 checked by the valve 5 may return to the supply tank. The discharge flow from this supply is regulated automatically herein for the maintenance of a constant volume reserve in the reservoir 6 by valve 7 as actuated by float 8 (Figs. 1, 4). Limit stop 8' precludes rocking of the taper valve stem reversely. Expansible packing 7' keeps the valve snugly seated. Hand hole 6' allows access for adjustment of the valve 7.

The warm liquid in the reservoir 6 may flow by duct 9 into housing 10 providing a chamber 11. The reservoir 6 has a drain or draw off line 13 with shut off valve 14 therein. This draw off line terminates at spigot 15. Back of this spigot 15 this line 13 is connected by duct 16 with the chamber 11. Accordingly at all times opening of the spigot 15 serves to drain the chamber 11, but opening of the spigot 15 only serves to drain the reservoir 6 when the valve 14 is also open. With the valve 14 open and the valve 15 closed, there may be flow through the duct 16 to supplement the flow through the duct 9 into the chamber 11. Pet cock 15' may be used as a water level check.

Within the chamber 11 is auxiliary lining of asbestos or as a compressible packing or seat 17 for rigid insulation lining 18. This lining 18, which is desirably of heat resistant glass, is shown as provided with intake ports 19 to primary heating chamber 20, with discharge port 21 to auxiliary chamber 22 having liquid level determining pet cock 23.

Riser line 24 from the chamber 22, has circulation balancing return or by-pass 25 back to the chamber 11. In the event of ascending flow exceeding the supply to the chamber 11, the line 25 may balance the circuit by return flow thereto. In the event the demand or free flow upward from the riser 24 is greater than the supply thereto from the chamber 22, the line 25 may coact to supplement the flow, although with liquid of less high temperature for the flow circuit.

The line 24 is here shown as extending into preheater chamber 3, there to envelop the coil 2, and then pass therefrom by line 26 for flow past the manually operable valve 27 to room heating radiator 28. In this vapor heating installation, with valve 29, from the radiator 28 also open, the condensation may be conducted away by line 30 directly to the reservoir 6. For manually controlled flow off or maintaining vapor circuit flow, even with the radiator 28 cut out, branch line 31 may be provided from the riser with adjustable valve 32 therein thus to regulate the flow or spill, which may be conducted outside as a waste, or have sewer connection.

To care for the emergency of any sudden rise in steam pressure in the circuit from the electric heater, automatic blow off or adjustable safety valve 33 is provided. In the operation of the installation, excessive pressure rise in the reservoir 6 or return lines thereto beyond that required for normal operation, may be taken care of by adjustable safety valve 34 near the reservoir 6, with discharge, say to sewer connection.

For maintaining a predetermined heating condition for the heating circuit, there may be taken into account the maintenance of a pressure in the reservoir 6 by such circuit. A lowering of such heater vapor pressure would mean a drop in temperature. Such reduced pressure in the reservoir 6 reduces the volume of liquid forced upward into cylinder 35 against piston 36, and the piston rod 37 descends as urged downward by lever 38 carrying weights 39.

Fulcrum 40 mounts this control lever 38 on the reservoir 6. This lever 38 in its shifting is effective at one limit for cutting out all electrodes, and therefrom cutting in pairs of electrodes 41 for the circuit. When in circuit, the electrodes 41, as parallel to each other complete the electric circuit at the gap therebetween through the liquid being heated. With the jump for such gap for the electrodes in the liquid to be heated, there is found desirability in practice as to efficiency in the conversion of the electric energy into heat in the liquid. Furthermore, the electrical insulation of the region of the gap from the conductor surface as holding the liquid for maintaining the electrodes submerged, is an additional factor for efficiency of this flash boiler hereunder. The electrodes 41 are assembled in liquid pressure holding insulation plate 42. Electric current supply conduit 43 extends to manually operable cutting in switch 44, and from thence has conduit 45 to the pressure controlled switch at the lever 38 and to the insulation head or plate 42 at the heater.

In a hot water installation, the electric heater is effective beyond the steam generation for vapor circuit promotion, in that water from line 46 past one-way valve 47 flows up into primary heating chamber 48 having electrical insulation lining 49. This water incoming flow submerges the electrodes 41 to provide electric circuit at the gap in generating steam to create an expansion of the contents of the chamber 48, pulsating a flow past one way valve 50 into riser line 24 for supply to the heating radiator 28 with return flow of the line 30 in communication with expansion tank 51. The line 30 has the line 46 connected thereto, so there is maintained supply effective as the expansion clears the liquid from the terminals or electrodes 41 in the chamber 49. With the current opened between the electrodes 41 by such steam generation to force liquid past the check valve 50, there is a drop in temperature in the chamber 48 as well as a drop in pressure. This opens the valve 47 for replenishing liquid flow to again fill the chamber 48 for electric heating action. There may be one or more pairs of these electrodes in a common chamber or boiler; there may be chambers in parallel or in series. With the chamber depending, instead of upstanding, there is defeated the pulsating action. There is thus provided hereunder an automatic electric heating and pumping of the heated liquid into the circuit in a simple and positively effective manner for rate of flow which may be regulated by the heating action of the electrodes, or by the check valves.

What is claimed and it is desired to secure by Letters Patent is:

1. A heating apparatus comprising a radiator and a duct forming a continuous circuit, a branch from said duct providing a chamber closed against fluid passage thereinto except through said branch, and electrodes disposed in said chamber having an electric circuit therethrough completed by liquid flow from said circuit through said branch into said chamber to have a part of the liquid gasified to create a pressure in said chamber for forcing the liquid back through said branch into the circuit.

2. A heating apparatus comprising a radiator and a duct forming a continuous circuit, a branch from said duct providing a chamber closed against fluid passage thereinto except through said branch, electrodes disposed in said chamber having an electric circuit therethrough completed by liquid flow from said circuit through said branch into said chamber to have a part of the liquid gasified to create a pressure in said chamber for forcing the liquid back through said branch into the circuit, and a check valve in said circuit maintaining one-way flow therethrough.

RALEIGH B. POINDEXTER.